INVENTOR
Edward L. Peters

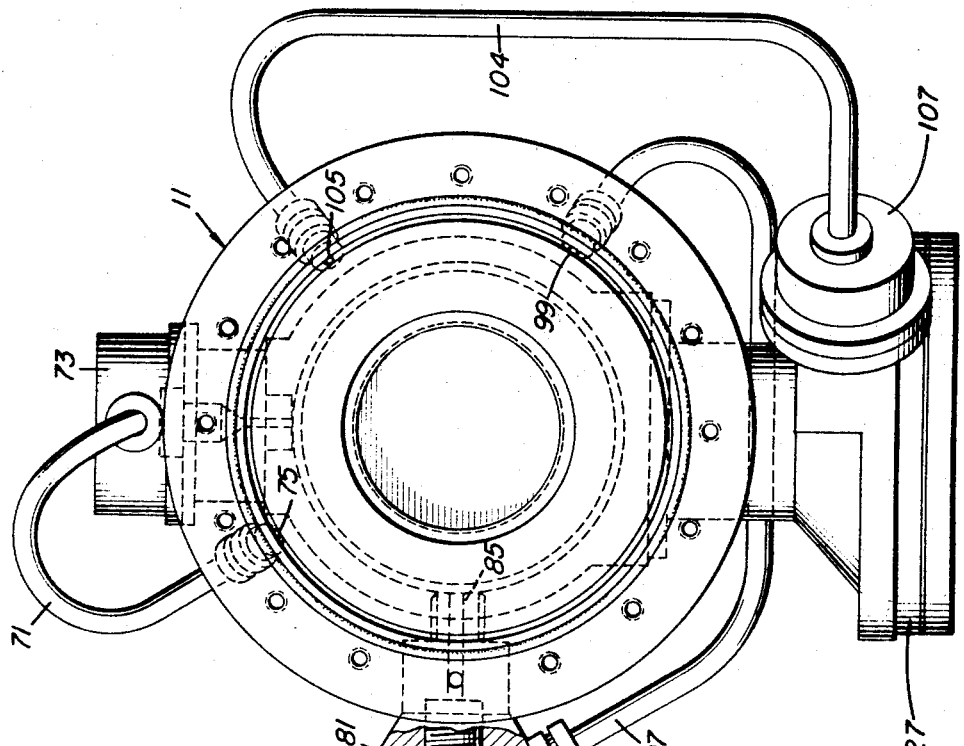
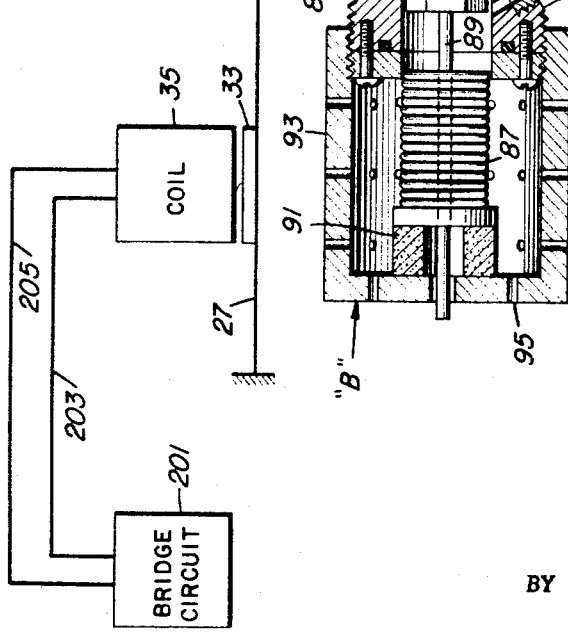

United States Patent Office 3,447,379
Patented June 3, 1969

3,447,379
DEEP WATER HYDROBAROPHONE
Edward L. Peters, Hyattsville, Md., assignor to the United States of America as represented by the Secretary of the Navy
Filed Oct. 5, 1966, Ser. No. 584,612
Int. Cl. G01l 9/00
U.S. Cl. 73—398                    1 Claim

ABSTRACT OF THE DISCLOSURE

A hydrobarophone has a main pressure transducer mechanism with an inflatable flexible bag responsive to pressure conditions within a body of water. The transducer and bag are enclosed within a temperature shield in the form of a housing made of glass fiber material to isolate the hydrobarophone from sudden temperature changes encountered in the body of water.

---

The invention described herein may be manufactured and used by or for the Goverenment of the United States of America for governmental purposes without the payment of any royalties thereon or therefor.

This invention relates to hydrobarophones and more particularly to incremental type hydrobarophones for deep water use.

This invention represents an improvement in the incremental hydrobarophone of the type disclosed in U.S. Patent No. 3,000,216. In this previously developed hydrobarophone an instrument was provided which would automatically compensate for the initial depth of water in which the unit was placed, eliminating the need for calibration for the particular water depth at which the unit was to be used. This prior art hydrobarophone provided an instrument that would not react to gradual changes in hydrostatic pressure such as that caused by tidal changes, waves, or swells, and yet would react to changes of pressure due to disturbances of the water caused by the passage of a ship, for example.

In the use of the incremental type hydrobarophone for deep water depths down to 1,000 feet, for example, a new hydrophone design was needed for the greater pressures encountered. In particular it was found necessary to provide protection for the diaphragm from excessive pressure differential during the raising of the unit from deep water depths.

An object of this invention is to provide an incremental type hydrobarophone for deep water use.

Another object of this invention is to provide an incremental hydrobarophone for deep water use substantially insensitive to variations in its water environment.

A further object of this invention is to provide an incremental type hydrobarophone for deep water use in which the pressure differential on the diaphragm is limited.

According to the present invention the foregoing and other objects are attained by providing a hydrobaraphone having an instrument casing with a relief valve provided between the outer and inner side of the diaphragm to prevent damage to the diaphragm during the raising from deep water depths. Additionally the design has been simplified by eliminating the sealing of the bellows and the liquid filler previously used and using a bellows which is open and filled with sea water after the hydrobarophone is placed in a body of water.

A more complete appreciation and many of the attendant advantages of this invention will be readily apparent as the same becomes better understood by reference to the following detailed description when considered with the accompanying drawings wherein:

FIG. 3 is a top view, partially in cross section, of the hydrobarophone; and

FIG. 4 is a diagrammatic view of an electrical bridge circuit employed in the hydrobarophone.

Figure 1:
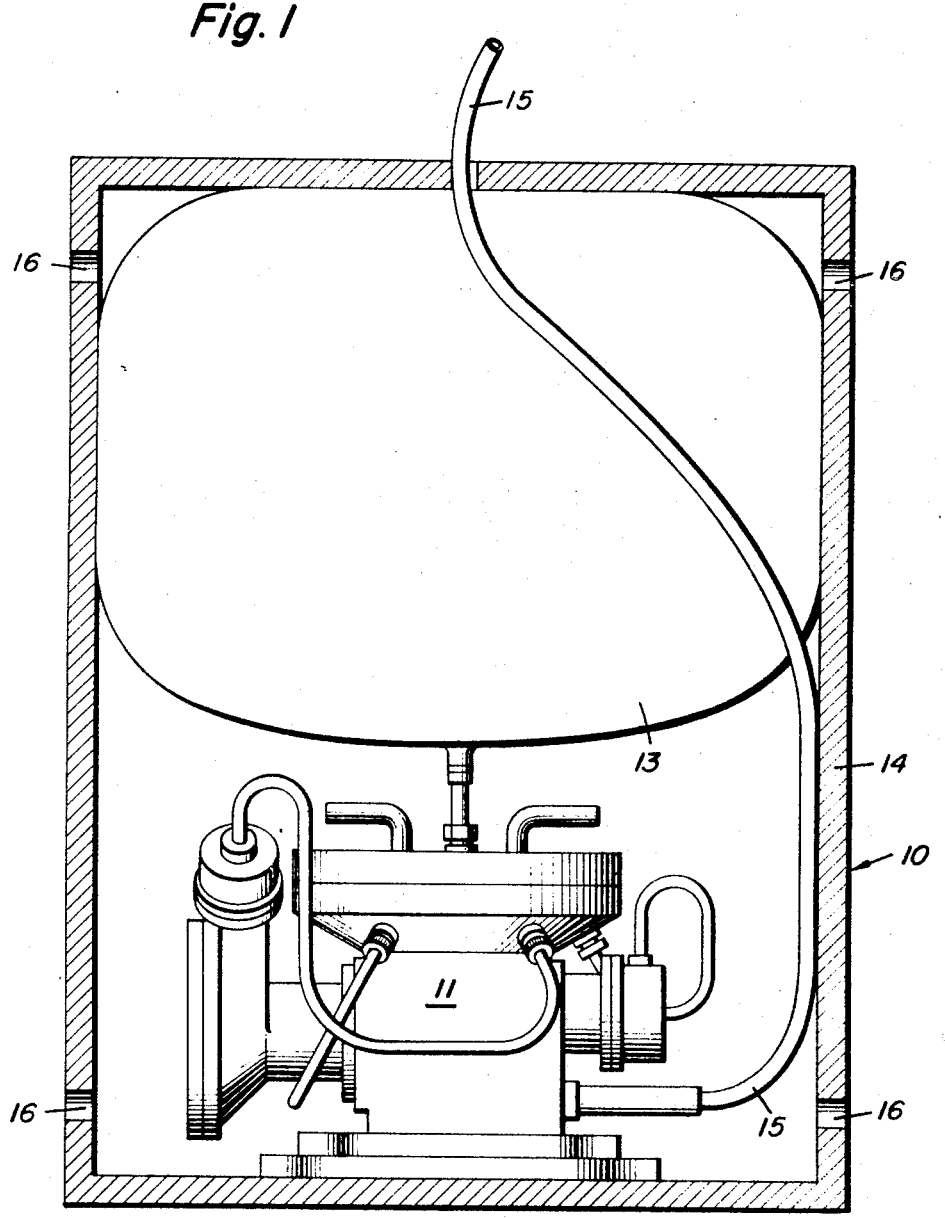
FIG. 1 is a side view illustrating the hydrobarophone of this invention mounted within a temperature shield.

Referring to FIG. 1, a hydrobarophone 10 is shown having a main casing or housing 11 with a flexible bag 13 connected thereto. The main casing 11 and the flexible bag 13 are enclosed within a container 14 which may be made of a glass fiber material and the bag 13 is coupled to an external source of inflating pressure, not shown. Container 14 acts as a temperature shield, isolating the the hydrobarophone from sudden temperature changes of the body of water surrounding container 14. A cable 15 connects to the hydrobarophone and to an unshown remote surface located station. The cable may include a plurality electrical conductors surrounded by wire cable material having sufficient structural strength to enable the cable to act both as a conductor of electrical signals and a structural means for lowering and raising the unit in and out of a body of water. Holes 16 are provided in the container 14 to allow gradual water interchange between the inside and the outside of the container.

Figure 2:
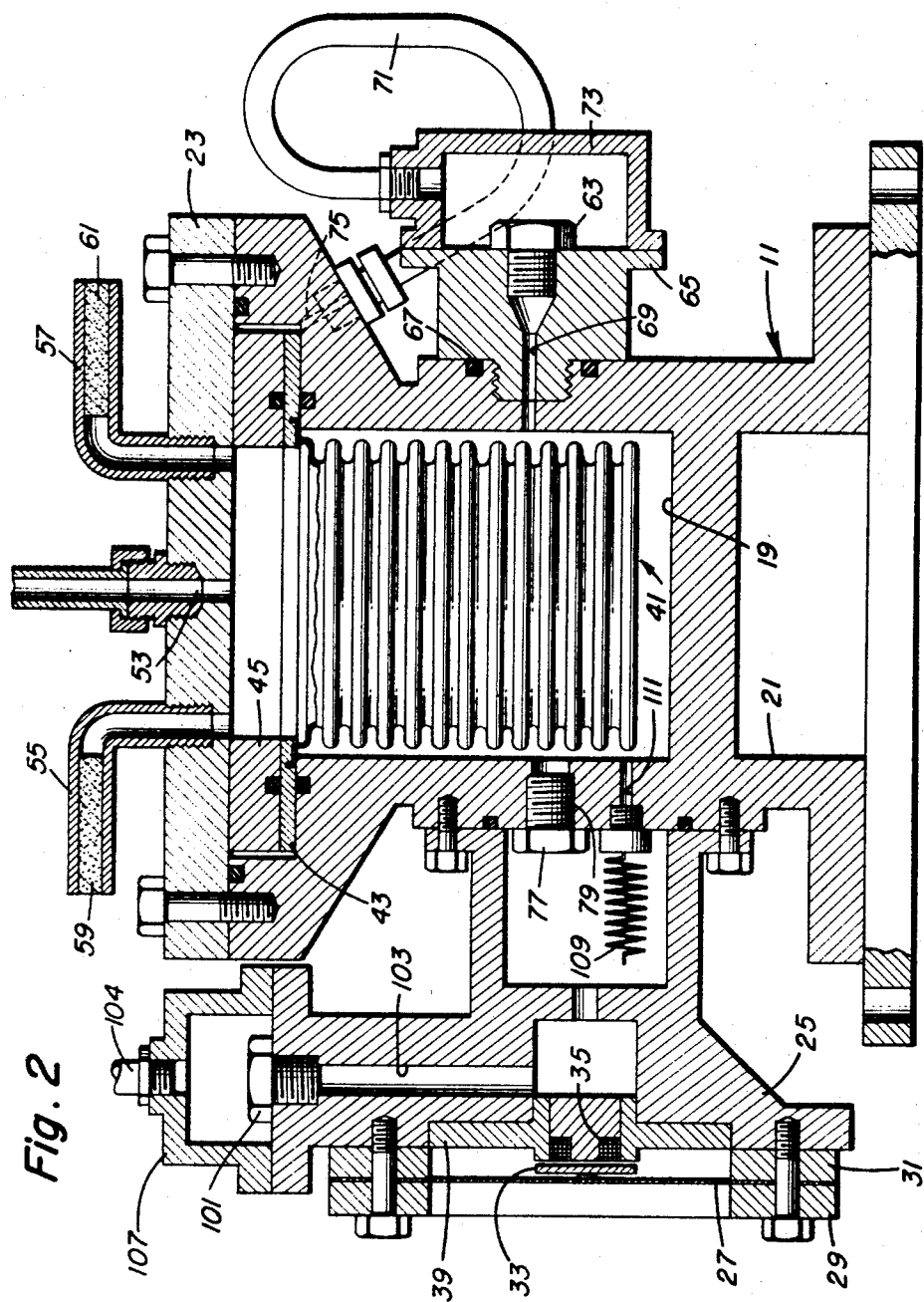
FIG. 2 is a sectional view of the hydrobarophone.

In FIGS. 2 and 3, the main casing or housing 11 is shown as having a bellows chamber 19 and an electronics chamber 21 therein. A cover plate 23 and a diaphragm housing 24 are removeably secured to housing 11. A thin metal diaphragm 27, which is held between mounting rings 29 and 31, is bolted or otherwise removably secured to the diaphragm housing 25. A ferromagnetic slug 33 is fixed attached to the inner side of diaphragm 27 for movement therewith. Slug 33 is positioned in close face adjacency to a coil 35 thereby providing an electromagnet. Coil 35 is mounted in an insulating material 37 within a mounting plate 39. The electrical circuit of this invention is more fully described hereinafter with reference to FIG. 4 of the drawings.

A bellows 41 is disposed within chamber 19 which is open at its upper end and closed at its lower end. The upper end of bellows 41 is fused to a metal ring 43. A nonmetallic ring 45 is placed adjacent to ring 43 on the upper side thereof and rings 43 and 45 are removeably secured to housing 11. An O-ring is disposed between rings 43 and 45 and another O-ring is disposed between the metallic ring 43 and housing 11. Flexible bag 13 (FIG. 1) is fastened to plate 23 and is in communication with the inner side of bellows 41 through tube passageway 53. Tubing portions 55 and 57 are threadly secured to plate 23 and contain water soluble cores 59 and 61 respectively.

These water soluble cores may be made of boric acid and are designed to be dissolved by sea water. A pop-off valve 63 is mounted within housing 65 which is threadedly secured to the main casing 11. Sealing of the connection is provided by an O-ring 67. A passageway 69 provides a connection between the lower chamber 19 and a tube 71 which is mounted on a cap 73. Tube 71 is also connected to a passageway 75. Passageway 75 leads into the upper portion of casing 11 which communicates with the inner side of bellows 41. Air passage is thus provided for from chamber 19 or the outer side of bellows 41 through passageway 69, valve 63, tube 71 and passageway 75 to the inner side of bellows 41. Pop-off valve 63 provides for limiting the pressure difference to a desired maximum such as three pounds per square inch between the inner side and the outer side of the bellows. A second pop-off valve 77 is disposed in a passageway 79 formed in housing 11 for the purpose of limiting the pressure difference between the inner side of diaphragm 27 and chamber 19. It is to be noted that there are no seals on mounting plate 39 and the air pressure adjacent to the inner side of diaphragm 27 is the same as the pressure in the chamber adjacent to valve 77. Pop-off valve 77 is preset for a differential pressure, such as for example three pounds per square inch to prevent to great a pressure difference between the outer side and the inner side of diaphragm 27 when the hydrobarophone is being lowered into the water. Pop-off valve 77 is a one way valve and opens only when the pressure in chamber 19 is greater than on the inner side of diaphragm 27.

As shown in FIG. 3, a pop-off valve 81 is mounted in a housing 83 which in turn is secured to the main housing 11. A passageway 85 formed within the housing 83 provides communication between the interior of the housing 83 and the outerside of bellows 41. The pop-off valve 81 is provided with a needle 89 which is urged by a bellows 87 to hold the valve open during the time that the hydrobarophone is lowered into the bed of a body of water. A soluble washer 91 is provided which melts after a period of time allowing bellows 87 to expand, causing needle 89 to be withdrawn, closing pop-off valve 81. This valve assembly is provided with a cap 93 having holes 95 formed therein for allowing seawater to enter therethrough so that the soluble washer 91 may be dissolved when the hydrobarophone is placed in the water. Air tube 97 connects one end of pop-off valve 81 to chamber 19 through a passageway 99 formed in the main casing 11.

As shown in FIG. 2, a fourth pop-off valve 101 is mounted on diaphragm housing 25 and connected through passageway 103 to the inner side of diaphragm 27. Pop-off valve 101 opens when a preselected differential pressure, such for example, as three pounds per square inch, is reached. Valve 101 is also connected to chamber 19 through a tube 104 and a passage 105. Valve 101 opens only when the pressure in passage 103 is greater than that in tube 104. A coil filter 109 is positioned in a passageway 111 and provides a restrictive air passage to chamber 19. The restrictive air passage means or filter 109 allows for a gradual equalization of pressure between the inside of the diaphragm 27 and the chamber 19 but prevents any sudden application of pressure from chamber 19 to the inner side of diaphragm 27.

As shown in FIG. 4, electromagnet coil 35 is connected to a bridge circuit 201 through conductors 203 and 205. The bridge circuit may be a Wein bridge circuit, for example.

In operation, prior to the hydrobarophone 10 is being lowered into the water, the flexible bag 13 is filled with air from the pressure source, not shown. As the hydrobarophone is lowered into the water and as the water enters through holes 16 to the inner side of container 14 and surrounds bag 13, the pressure in bag 13 is increased and this increase in pressure is applied through passage 53 to the inner side of bellows 41. Bellows 41 will then expand causing an increase in pressure in chamber 19 which is transmitted through passageway 111 and filter 109 to the inner side of diaphragm 27. In addition, the pressure entering bellows 41 from flexible bag 13 through passage 53 passes through passageway 99 and tube 97 to the pop-off valve 81 which at this time is held open by needle 89. Should the pressure differential between chamber 19 and the inside of the diaphragm 27 exceed the preselected pressure during lowering, valve 77 will open preventing a greater differential in pressure between the chamber 19 and the inner side of diaphragm 27.

After the hydrobarophone has been placed in the bed of a body of water, water soluble cores 59 and 61 will dissolve allowing sea water to enter through tubes 55 and 57 into bellows 41. The pressure of the sea water in bellows 41 is transmitted to chamber 19 and through the acoustic filter 109 and to the inner side of diaphragm 27. The pressure of sea water in chamber 19 will be exerted against the outside of diaphragm 27. The water soluble washer 91 will also dissolve causing the initially open pop-off valve 81 to permanently close, thereby effectively cutting off airpassage between the bag 13 and chamber 19. When gradual swells or tidal changes occur to change the pressure on both the interior and the exterior of the diaphragm there will be no movement of the diaphragm and no output signal will be produced in coil 35. When changes of pressure of short duration occur, however, such changes will be too fast for the change in pressure to be communcated through the restrictive filter 109 and diaphragm 27 which carries permalloy slug 33 will move causing a current to be generated in coil 35 to indicate a pressure difference. The current is applied to the bridge circuit 201. The variation in inductance in coil 35 caused by movement of slug 33 may be amplified through electronic equipment and displayed on an indicator or recorded with a device such as an ink recorder.

When the hydrobarophone is raised, the limited pressure differential between chamber 19 and the pressure within bellows 41 is provided by pop-off valve 63. A limited pressure differential between the outside of diaphragm 27 and the inside thereof is provided by pop-off valve 101 which is actuated whenever the pressure differential exceeds the preselected pressure three pounds per square inch.

Obviously many modifications and variations of the present invention are possible in the light of the above teachings.

What is claimed is:
1. A hydrobarophone for use in the depths of the sea comprising:
   an insulated container having a casing enclosed therein;
   said casing having a first chamber;
   an inflatable flexible bag in said container exposed exteriorly to the sea through holes formed in said container;
   an open bellows mounted within said first chamber dividing said first chamber into an open inner portion and an outer portion sealed from said inner portion;
   passage means connecting the interior of said bag to said inner portion of said first chamber;
   a metal diaphragm having an inner side and an outer side;
   a high permeability ferromagnetic slug fixedly mounted on the inner side of said diaphragm for movement therewith;
   diaphragm mounting means mounting said diaphragm on the exterior of said casing and forming a second chamber between said diaphragm and said casing;
   restrictive air passage means connecting said second chamber to said outer portion of said first chamber for passing air pressure from said outer portion to said second chamber when the pressure changes are slow and preventing the passage of air pressure when the pressure changes are sudden;
   means including a soluble washer providing an air passage between said inner and outer portions of said first chamber during the lowering of said container in the water, said soluble washer being dissolved by the water causing said air passage to close after said container has been deposited in the bed of the body of water;
   second water soluble means between said inner portion and the outside of said casing for sealing said inner portion from ambient water within said container during the lowering of said container in the water and permitting entry of water from said container into said bellows after the dissolving of said soluble means by the water;
   first pressure limiting means connected between said inner and outer portions of said first chamber and openable when the pressure in said outer portion is greater than the pressure in said inner portion by a preestablished amount.
   second pressure limiting means between the outer portion of said first chamber and said second chamber and openable when the pressure in said outer portion is greater than that in said second chamber by a preestablished amount;

third pressure limiting means connected between said inner portion of said first chamber and said second chamber for venting said pressure in said second chamber when the pressure in said second chamber is greater than the pressure in said inner portion by a preestablished amount sufficient to protect said diaphragm from rupturing during the time said container is being raised from the bed of the body of water;

coil means adjacent said slug;

means including an electrical bridge circuit for detecting a change in inductance in said coil when said slug is moved by a change in pressure between said inner and outer sides of said diaphragm.

References Cited

UNITED STATES PATENTS

| 3,000,216 | 9/1961 | Peters et al. | 73—378 |
| 3,162,051 | 12/1964 | Peters | 73—431 |

LOUIS R. PRINCE, *Primary Examiner.*

D. O. WOODIEL, *Assistant Examiner.*

U.S. Cl. X.R.

73—300, 301, 407